(No Model.) 2 Sheets—Sheet 1.

E. BAKER.
APPARATUS FOR DETERMINING THE BEARINGS AND COURSE OF A SHIP.

No. 499,087. Patented June 6, 1893.

WITNESSES:
George Baumann
James Gracie

INVENTOR
Edwin Baker
BY Howson and Howson
his ATTORNEYS.

(No Model.) 2 Sheets—Sheet 2.

E. BAKER.
APPARATUS FOR DETERMINING THE BEARINGS AND COURSE OF A SHIP.

No. 499,087. Patented June 6, 1893.

WITNESSES:
George Baumann
James Gracie

INVENTOR
Edwin Baker
BY
Howson & Howson
ATTORNEYS.

UNITED STATES PATENT OFFICE.

EDWIN BAKER, OF CARDIFF, ENGLAND.

APPARATUS FOR DETERMINING THE BEARINGS AND COURSE OF A SHIP.

SPECIFICATION forming part of Letters Patent No. 499,087, dated June 6, 1893.

Application filed December 27, 1892. Serial No. 456,413. (No model.) Patented in England September 29, 1890, No. 15,408, and November 12, 1891, No. 19,626.

*To all whom it may concern:*

Be it known that I, EDWIN BAKER, a subject of the Queen of Great Britain and Ireland, and a resident of Cardiff, county of Glamorgan, Wales, England, have invented an Improved Apparatus for Determining a Ship's Course and Bearings, (for which I have obtained two British patents, No. 15,408, dated September 29, 1890, and No. 19,626, dated November 12, 1891,) of which the following is a specification.

The object of this invention is to construct an apparatus for determining the bearings and course of a ship or other object so that at a glance the true, magnetic and compass courses may be read simultaneously, together with the true, magnetic and compass bearings of any object.

Figure 1:
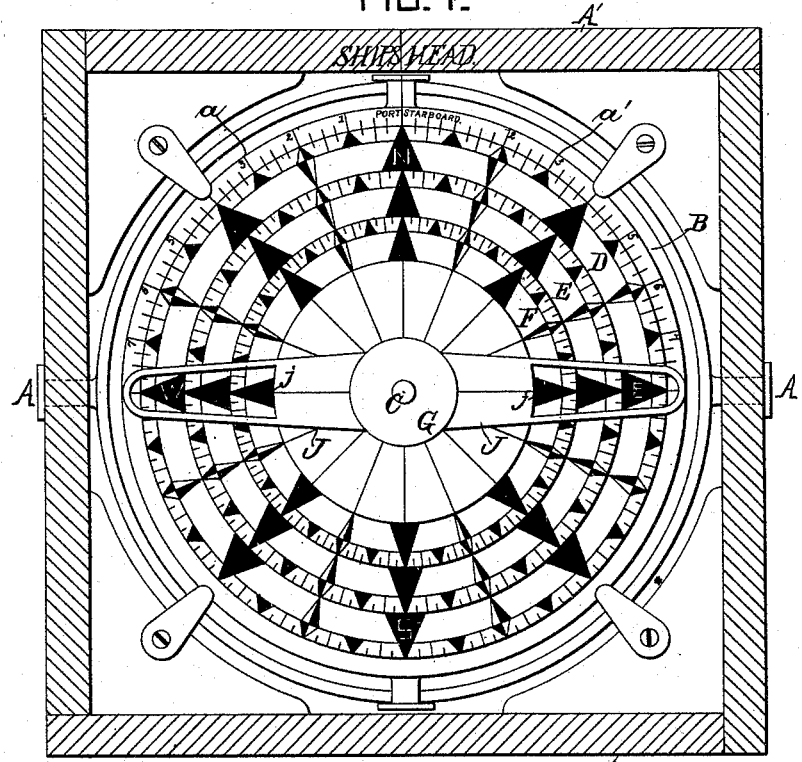
Figure 6:
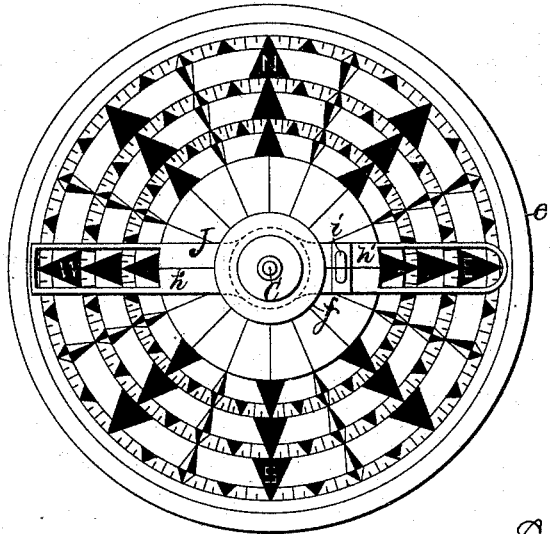
Figure 3:
Figure 2:
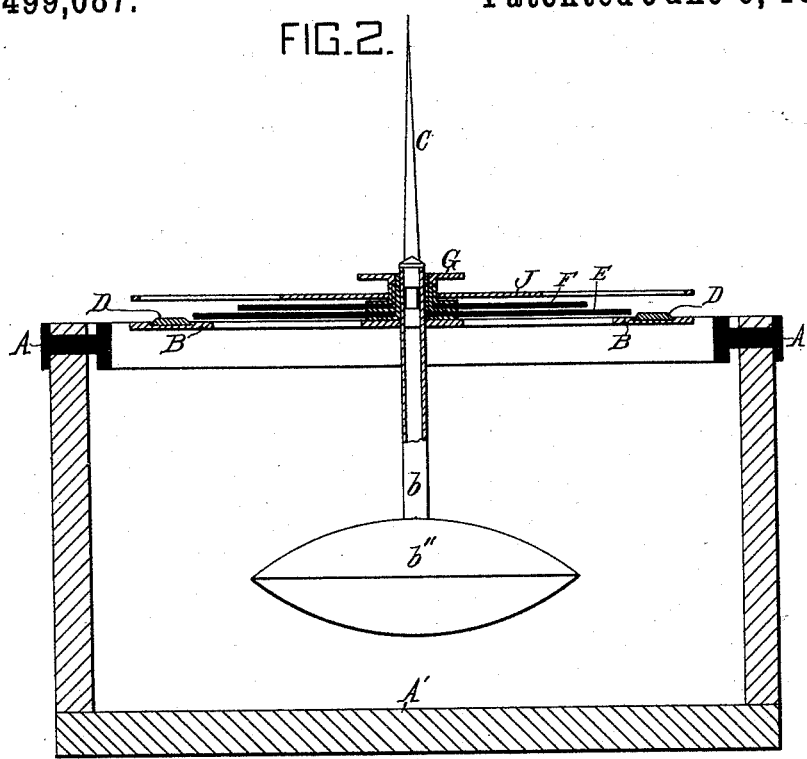
Figure 5:
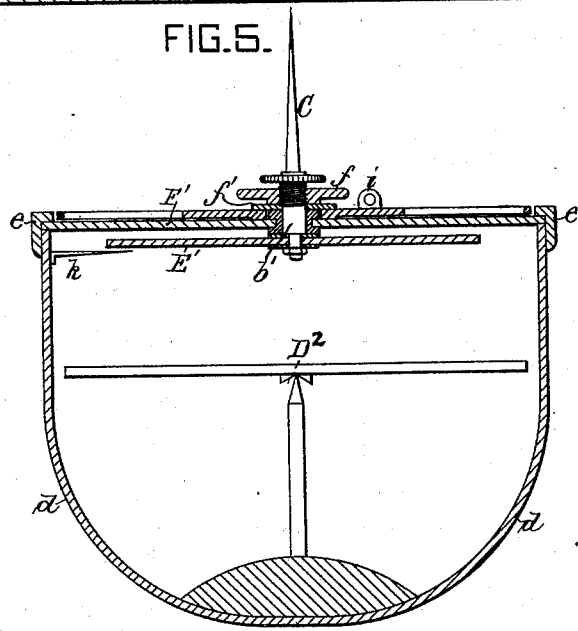
Figure 4:
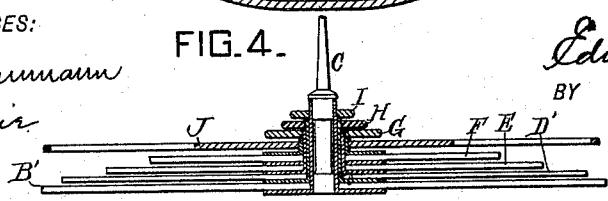

In the accompanying drawings: Figure 1 is a plan view, and Fig. 2 is a vertical section of one form of my apparatus as mounted on gimbals for use on board ships in conjunction with the ship's compass. Fig. 3 is a side elevation of the simplest form of my compass cards. Fig. 4 is a sectional elevation of another form. Fig. 5 is a vertical section and Fig. 6 a plan of a ship's compass constructed in accordance with or provided with my improvements.

Referring to Figs. 1 and 2, B is a base plate carrying my three compass cards and supported by gimbals A A within the case A'. On a part of the outer edge of this base are marked lines $a$ $a'$ to indicate the leeway as affecting the ship's course. From the base plate hangs a central spindle $b$ having at its extremity a balance weight $b'$. A shadow pin C is fixed upon the top of the spindle $b$.

Of the three compass representations, D is what may be termed the compass card, E is the magnetic card, and F is the true card. All these three compass representations or cards are marked like ordinary compass cards without magnets but they are of different diameters, the "compass card" being the largest of the three, so that the points upon all are equally visible. The cards are concentric and can each be turned freely about the common axis of the instrument.

In the construction shown in Figs. 1 and 2 the "compass card" D is shown as made in the form of a ring set into an annular groove in the face of the base plate B. A screw clamp or nut G is employed to clamp the true card to the magnetic card E. I do not however confine myself to any particular clamping device. Over these cards, and also free to turn about the axis of the instrument, is arranged the bearing radius J which consists of a metal bar with sight-holes near its opposite ends, through which the cards below can be read. Diametrical reading lines $j$ $j$ are stretched across these holes, or other well known sighting means may be employed such as a bar having sight-holes at one end and a sight-line at the other.

I may employ one clamping nut to clamp all three cards together. I have shown this construction in the simpler form of my invention illustrated in Fig. 3, in which B' represents the base plate, the box or case A' being dispensed with. In this construction the compass card D' is a flat card or plate lying between the base B' and card E instead of being made in the form of a ring, as described with reference to Figs. 1 and 2.

In Fig. 4 I have illustrated a construction of cards somewhat similar to that of Fig. 3, except that three separate clamping screws are shown, one G to clamp the true card F to the magnetic card E, while another clamp H is adapted to clamp the magnetic card E to the compass card D', the third clamp I being adapted to clamp the compass card D' to the base plate B'. These constructions shown in Figs. 3 and 4 are cheap modifications intended more particularly to hang up in a vessel's chart room, and to be used to show the deviation when the ship's compass is fitted with a shadow pin, or other means of obtaining a reliable bearing of the sun. They can be used for all the other uses of the complete instrument.

The following general directions for the use of the apparatus will illustrate its scope and practical utility:—If the box or case illustrated in Figs. 1 and 2 is employed it is arranged in a convenient place, so that the diametrical line passing through the point marked "ship's head" shall be parallel with the keel of the vessel. Then the outer or compass card is set to the course in which the vessel is being steered. The middle or magnetic card is then set to the inner or true card for the variation and these two are preferably then clamped together. The bearing line is then set to the sun's true bearing (as per Azimuth's tables) on the true card, and the true and magnetic cards which are clamped together are then turned until the shadow from the pin falls on the reverse half of the bearing line. The difference between the magnetic and the compass cards will give the deviation. Being now set for variation and deviation, the bearing line placed to the ship's head shows the true, magnetic and compass course you are steering; placed to port or starboard of the ship's head corresponding with the leeway, it shows the true, magnetic and compass course through the water; to leeway, then the course steered is the course made through the water. Set as above the bearing line placed over any point on the compass cord corresponding with any bearing taken by the ship's compass, it shows the true, magnetic and compass bearing at once; placed over a magnetic bearing taken from a magnetic chart, it shows what that bearing would be by the ship's compass.

Instead of constructing my apparatus for use in connection with the ordinary ship's compass, as before explained, I may combine it with a ship's compass. For instance in Figs. 5 and 6 I have shown my invention as applied in connection with a compass, $D^2$ being the ordinary compass card carrying the magnetized needles and mounted on a fine bearing point, as usual. With this are combined a true card $F'$ and a magnetic card $E'$. The three cards or card representations are necessarily of different diameters in order that their respective markings may be read easily and without confusion all at the same time. The card $F'$ is preferably set out on the glass top of the compass bowl $d$ as shown, the glass top being held to the bowl by a screw ring $e$. The magnetic card $E'$ is marked on a glass disk suspended from the center of the glass top which carries the true card $F'$. This glass disk is carried by a hub $b'$ passing up through the glass top of the compass bowl and carrying a shadow pin C. Around this hub is also arranged the radius bar J with the bearing lines $h'$ and spirit level $i$. The latter may however be dispensed with. A thumb screw $f$ is provided whereby the magnetic card may be set or adjusted with reference to the true card and if desired, clamped there.

The leeway may be marked on either side of the "lubber's line" inside the bowl. A pointer $k$ projecting within the bowl may be used to indicate the position of the ship's head. It is commonly known as the lubber's line.

The magnetic card (or suspended disk) is set to the true card (as marked on the glass top) for the variation, and the bearing line placed to the true bearing on the true card. Then the whole top is moved until the shadow of the pin falls on the reverse half of the bearing radius. The lubber's line will then show the true, the magnetic and the compass course. The difference between the true (as marked on the glass top), and the magnetic (as marked on the suspended disk) is the variation, the deviation being the difference between the magnetic disk and the actual compass card.

Instead of the shadow pin, other well known means may be used to get the sun's bearing.

It will be understood that I have used the word "card" in a sufficiently wide sense, to mean any compass representation or marking upon any convenient material, and of any convenient form and style.

I claim as my invention—

1. The herein described appliance for determining the bearings and the course of a ship or other object, consisting in the combination of three compass cards on the same axial line two of said compass cards being adjustable with reference to each other and to the third compass card.

2. The herein described appliance for determining the bearings and course of a ship or other object, consisting in the combination of three compass cards on the same axial line two of said compass cards being adjustable with reference to each other and to the third compass card, with a bearing radius and a shadow pin.

3. The herein described appliance for determining the bearings and the course of a ship or other object, consisting of the combination of three compass cards on the same axial line, two of said compass cards being adjustable with reference to each other and to the third compass, a bearing radius and a shadow pin with a case and gimbal mountings for the cards.

In testimony whereof I have signed my name to this specification in the presence of two subscribing witnesses.

EDWIN BAKER.

Witnesses:
JAMES HOUGHTON,
THOS. McDONALD.